United States Patent [19]

Justice

[11] Patent Number: 5,456,514
[45] Date of Patent: Oct. 10, 1995

[54] TRUCK BED LOAD ORGANIZER APPARATUS

[76] Inventor: Kendall Justice, P.O. Box 20489, Wickenburg, Ariz. 85358

[21] Appl. No.: 358,765

[22] Filed: Dec. 19, 1994

[51] Int. Cl.$^6$ ................................................. B60R 13/01
[52] U.S. Cl. ................ 296/39.2; 410/122; 224/42.34; 224/403; 224/497; 224/498; 224/502; 224/542; 220/530; 105/423
[58] Field of Search .................. 296/39.2, 39.1; 410/129, 135, 122; 224/42.42, 42.34, 42.33, 273; 105/423; 220/529, 530, 531

[56] References Cited

U.S. PATENT DOCUMENTS 4,733,898  3/1988  Williams .................... 224/42.42 X
4,875,730  10/1989  Justice ............................... 296/37.6

Primary Examiner—David M. Mitchell
Assistant Examiner—Kia M. Robinson
Attorney, Agent, or Firm—H. Gordon Shields

[57] ABSTRACT

Pickup truck bed organizer apparatus includes a layer of flat belting material in which a plurality of panels is defined by a plurality of cuts. Each panel extends between the sides of the material and is pivotable from a down position to an up position. The panels are under tension in their up position due to the inherent properties of the material and return to their down position as part of the layer material when goods which are against them are removed. The panels are pivoted to divide the cargo or bed area of the truck into any of a plurality of separate compartments for organizing goods or cargo or for holding the cargo in any or all of the various compartments.

7 Claims, 1 Drawing Sheet

5,456,514

TRUCK BED LOAD ORGANIZER APPARATUS

BACKGROUND OF THE INVENTION

1. Field of the Invention

This invention relates to apparatus for the bed of trucks and, more particularly, apparatus for organizing and stabilizing different types of loads and different sizes of loads in truck beds.

2. Description of Prior Art

U.S. Pat. No. 4,875,730, the patentee of which is the inventor hereof, discloses apparatus for organizing and stabilizing various size loads on the beds of pickup trucks. The apparatus includes a frame on which there are pivoting elements that extend into cutout portions of the frame. The pivoting elements are in their "down" and nested position until they are needed to stabilize or to organize the loads. When needed, and as needed, one or more of the pivoting elements may be moved to a vertical position.

The apparatus of the '730 patent utilizes a base element of a finite thickness, and the pivoting elements nest into the base. The apparatus of the present invention simplifies the '730 patent by obviating the necessity of hardware such as springs and other metallic assemblage.

U.S. Pat. No. 2,697,631 (Miller) discloses a truck bed in which there is a partition which is movable for securing a load in a specific portion of the truck bed. The apparatus is secured to the upper portions of the vehicle sides.

U.S. Pat. No. 4,278,376 (Hunter) discloses a load restraining panel for a pickup truck in which the panel is movable on a pair of parallel rails secured to the bed of the truck.

U.S. Pat. No. 4,717,298 (Bott) discloses apparatus similar to that of the '376 (Hunter) patent in that a pair of spaced apart rails extending longitudinally on the bed of a truck are used as base elements for a vertical panel that is secured to clamps movable along the rails.

U.S. Pat. No. 4,507,033 (Boyd) discloses apparatus for securing a load in the back of a truck that includes a pair of rails secured to the top of the sides of the truck. A panel extends between the rails and is pivotable between an up position and a down position. In the down position, the panel extends from the rails downwardly towards the bottom or bed of the truck. In the up position, the panel is moved 180 degrees from its down position and accordingly extends upwardly from the side rails.

U.S. Pat. No. 4,733,899 (Keys) discloses divider apparatus for dividing the bed of a pickup truck. The apparatus comprises a panel which may be disposed either immediately behind or immediately in front of the wheel wells on the bed of a pickup truck. The divider apparatus includes a secondary space which is relatively narrow and immediately adjacent to the main transverse panel.

Of the above discussed patents, only the applicant's own '730 patent discloses a use of multiple panels for dividing the cargo area of a truck into a plurality of different compartments. All of the other patents simply utilize a single panel that may be moved relative to the truck bed to divide the truck bed into two compartments, a compartment on each side of the transverse panel.

SUMMARY OF THE INVENTION

The invention described and claimed herein comprises a truck bed organizer which comprises a generally flat layer of material disposed on the bed of a truck and which includes a plurality of flaps pivotally movable to an upright position from the flat material and which flaps define panels for holding or maintaining goods disposed on the bed in an organized fashion. The panels are cut into the layer of material and maintain their upright position due to the goods which are disposed adjacent or against them. When the goods are removed, the flaps or panels return to their down, flat, position as part of the layer material.

Among the objects of the present invention are the following;

To provide new and useful apparatus for organizing a truck bed into a plurality of compartments;

To provide new and useful panel apparatus for a truck bed;

To provide new and useful protector apparatus for a truck bed;

To provide new and useful apparatus for a truck bed utilizing a layer of material and a plurality of panels defined in the material by a plurality of cuts;

To provide new and useful apparatus having pivoting panel elements which pivot through an angle of about ninety degrees from a down position to an up position; and To provide a new and useful truck bed panel apparatus made of flexible material.

DESCRIPTION OF THE PREFERRED EMBODIMENT

Figure 1:
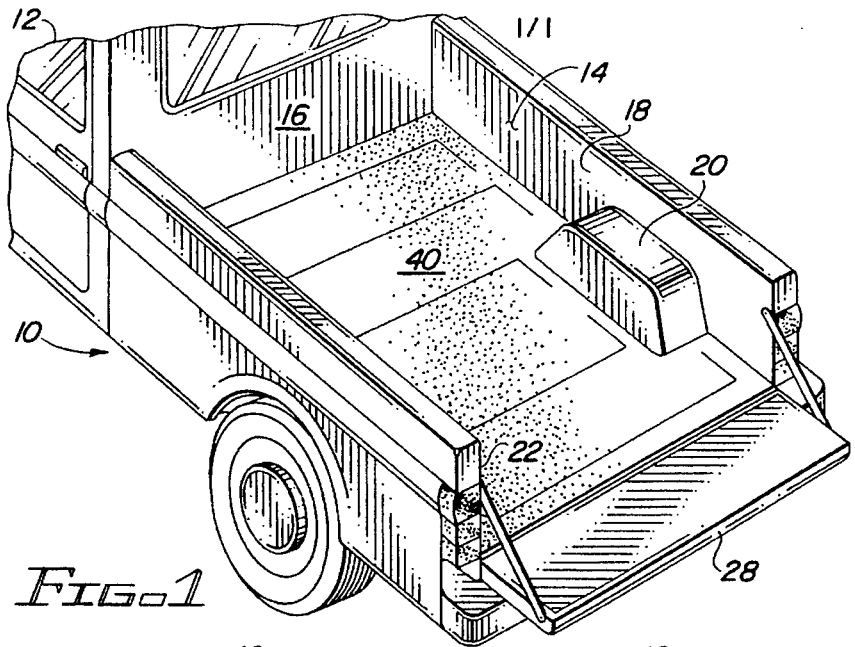
FIG. 1 is a perspective view of the apparatus of the present invention in its use environment.

FIG. 1 is a perspective view of a pickup truck 10, or a portion of a pickup truck 10, illustrating bed organizer apparatus 40 disposed on the truck. The truck 10 includes a cab 12, and a rear cargo hauling portion 14 behind the cab 12. The cargo hauling portion 14 is defined by a front wall 16, a pair of side walls 18 and 22, and a tailgate 28.

Fender wells 20 and 24 extend inwardly into the cargo hauling area 14 from the side walls 18 and 22, respectively.

Figure 5:
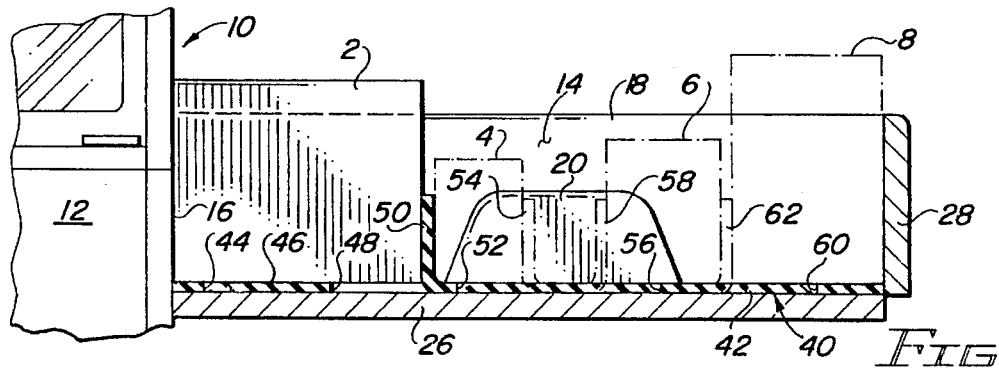
FIG. 5 is a side view in partial section illustrating the functioning of the apparatus of the present invention in its use environment.

As shown in FIG. 5, the cargo hauling portion 14 also includes a bed 26. The bed organizer apparatus 40 is disposed on the bed 26.

The front wall 16, the side walls 18 and 22, with their fender wells 20 and 24, and the tailgate 28 comprise, for purposes of the present invention, walls which define the overall cargo hauling portion 14 of the truck 10.

Figure 2:
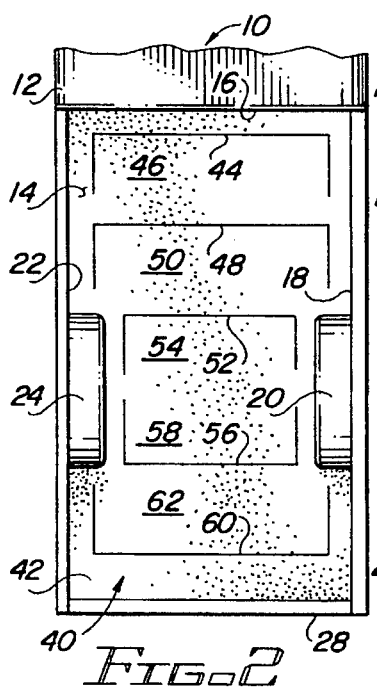
FIG. 2 is a top view of a portion of the apparatus of FIG. 1.
Figure 3:
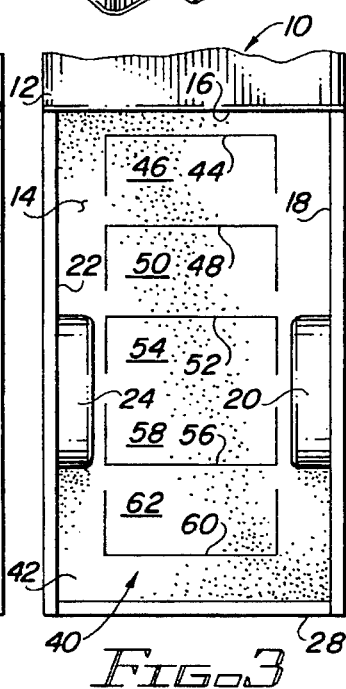
FIG. 3 is a top view of an alternate embodiment of that shown in FIG. 2 illustrating uniform panel elements.
Figure 4:
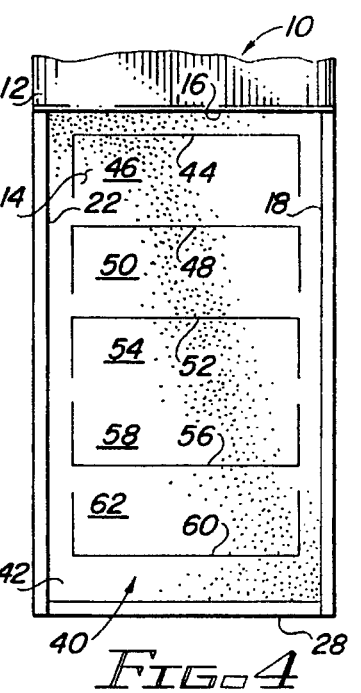
FIG. 4 is a top view of another alternate embodiment illustrating uniform panel elements in a rectangular truck bed.

FIGS. 2, 3, and 4 are top views of truck apparatus 10, with the fender wells 20 and 24 illustrated in FIGS. 2 and 3 as extending into the cargo hauling portion 14. In FIG. 4, the cargo hauling area 14 is generally rectangular, with the fender wells 20 and 24 removed.

FIG. 5 is a side view in partial section of the truck apparatus 10 of FIGS. 1, 2, and 3, illustrating the apparatus of the present invention relative to cargo elements.

Goods are, of course, disposed on the bed 26, with the front wall, side walls, the fender wells, and the tailgate defining the outer vertical boundaries which enclose the cargo or goods. Panels or flaps cut into the apparatus 40 define inner walls for limiting movement of cargo elements, as shown in FIG. 5.

Often, cargo or goods are placed on the bed in the cargo hauling portion of a truck and which cargo or goods may move indiscriminately since they occupy substantially less space than the entire wall-enclosed cargo area. The bed organizer apparatus 40 includes a plurality of flaps which may be pivoted or moved from their down position, as an inherent part of the bed organizer apparatus upwardly to comprise vertical restraints or restriction which help to hold cargo in place.

The bed organizer apparatus 40 comprises a base mat 42 preferably made of a heavyweight rubber conveyor belting material. Typically, such material is about one-half inch (1.76 cm.) thick, and comprises a layer of cording disposed between layers of covering material. That is, there is typically a bottom layer, a layer of cording, and a top layer of material which comprises the heavyweight rubber conveyor belting material.

The panels or flaps are defined by a plurality of cuts in the base mat material. There are three forward flaps or panels and two rear flaps or panels, with the forward flaps facing rearwardly and rear flaps facing forwardly. Each "cut" includes three separate cuts per panel, and comprises three legs forming a generally wide block "U" There is a top cut 44, a second cut 48, and a third cut 52, all of which comprise the forward flaps. Rearwardly of the forward cuts 44, 48, and 52, are rear cuts 56 and 60.

As may be understood from the drawing, the forward cuts face rearwardly, and the rear cuts face forwardly.

For purposes of the discussion herein, the differences among FIGS. 2, 3, and 4 are essentially the width of panels or flaps defined by cuts in the base mat material. Structurally, the base mats 42 shown in the Figures is the same, and the only differences are in the width of the cuts. FIGS. 2 and 3 both disclose fender wells 20 and 24 which extend into the cargo hauling area 40. NO fender wells are shown in FIG. 4. In FIG. 2, the cuts 44 and 48, and 60, Which are outside of the fender wells, are wider than the cuts 52 and 56, which are inside of, or between, the fender wells. The width of the cuts in FIG. 3 conform to the width of the relatively narrower cuts 52 and 56 of FIG. 2.

In FIG. 3, the cuts are all of uniform size. In FIG. 4, the cuts are also of uniform size, comparable to the relatively wider cuts 44, 48, and 60 of FIG. 2.

The cuts 44, 48, and 52 define panels 46, 50, and 54, respectively. It will be noted that the cuts 44 and 48, and accordingly the panels 46 and 50, are substantially wider than the cut 52. The cut 52 is disposed between the wheel wells 20 and 24, and the cuts 44 and 48 are forwardly of the wheel wells and extend laterally a greater distance than does the cut 52. Similarly, the fifth or rear cut 60 is wider than the cut 56, because the cut 56 is again disposed between the wheel wells 20 and 24, while the cut 60 is rearwardly of the wheel wells and is substantially the same width as the forward cuts 44 and 48. The rear cuts 56 and 60 define rear flaps 58 and 62, respectively.

Each panel is defined by a pair of relatively short cuts spaced apart and generally parallel to each other and a cut which connects the ends of the parallel cuts. The three cuts accordingly define a panel connected to the base mat by a living hinge. The parallel cuts are the legs or arms of the "U" and the connecting cut is the bottom or base of the "U".

In FIG. 4, the pickup truck is shown without wheel wells, and accordingly the cuts are all the same size. Again, there are three forward cuts and two rear cuts.

FIG. 5 comprises a view in partial section through a portion of the pickup truck 10 and the bed organizer apparatus 40. The base mat 42 is shown with four cargo elements, 2, 4, 6, and 8 shown disposed on the base mat 42. The five cuts 44, 48, 52, 56, and 60 are shown. The forward flap 46 is in its down position, while the flap 50 is moved to its up, panel, position, substantially ninety degrees above the base mat 42, and the cargo element 2 is disposed between the front wall 16 and the upraised flap or panel 50.

Rearwardly of the cargo element 2 is a cargo element 4. The cargo element 4 is disposed between the raised panels 50 and 54.

The rear panels 58 and 62 are shown in their upwardly pivoted or raised positions, with cargo elements 6 and 8 disposed against them. The cargo element 6 is disposed between the panels 58 and 62, while the cargo element 8 is disposed between the panel 62 and the tailgate 28.

It will be noted that any of the flaps, or any combination thereof, may be appropriately raised to their panel position or orientation, as desired by the shape or size of the cargo disposed on the base mat 42.

It will also be noted that the bed organizer apparatus 40 also comprises a bed protector to protect the bed 26 while cargo is being hauled, etc.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Truck bed organizer apparatus comprising in combination:

a sheet of material having an inherent tension capacity to maintain a flat orientation, disposed on a truck bed; and a plurality of cuts in the material defining a plurality of flaps in the sheet, each of which flaps is movable between a down position as part of the sheet of material and an up position defining a vertical restraint panel for holding cargo disposed on the bed in place.

2. The apparatus of claim 1 in which the plurality of cuts comprises a plurality of three cuts for each flap, including a pair of generally parallel and spaced apart cuts and a cut connecting the pair of generally parallel cuts, in the configuration of a wide block "U".

3. The apparatus of claim 1 in which the sheet of material comprises rubber belting.

4. The apparatus of claim 3 in which the rubber belting includes a layer of cording disposed between and secured to a pair of layers of rubber.

5. A method of providing a truck bed organizer for stabilizing cargo on a truck bed including the steps of providing a layer of material having an inherent memory for lying flat; and providing a panel in the layer of material by a generally wide U-shaped cut.

6. The method of claim 5 which further includes the step of pivoting upwardly the panel to stabilize cargo disposed on the truck bed.

7. The method of claim 5 which further includes the step of providing a plurality of pivotable panels by a plurality of generally U-shaped cuts.

* * * * *